(12) United States Patent
Suzuki et al.

(10) Patent No.: US 10,733,127 B2
(45) Date of Patent: Aug. 4, 2020

(54) DATA TRANSMISSION APPARATUS AND DATA TRANSMISSION METHOD

(71) Applicant: FUJITSU LIMITED, Kawasaki-shi, Kanagawa (JP)

(72) Inventors: Toshihiko Suzuki, Kawasaki (JP); Shinya Miyata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/175,896

(22) Filed: Oct. 31, 2018

(65) Prior Publication Data

US 2019/0155774 A1 May 23, 2019

(30) Foreign Application Priority Data

Nov. 17, 2017 (JP) .................................. 2017-222120

(51) Int. Cl.
*G06F 13/40* (2006.01)
*G06F 13/28* (2006.01)
*G06F 13/16* (2006.01)

(52) U.S. Cl.
CPC ...... *G06F 13/4018* (2013.01); *G06F 13/1673* (2013.01); *G06F 13/1678* (2013.01); *G06F 13/1689* (2013.01); *G06F 13/28* (2013.01); *G06F 13/4022* (2013.01)

(58) Field of Classification Search
CPC .. G06F 13/16; G06F 13/1673; G06F 13/1678; G06F 13/4009; G06F 13/4018
See application file for complete search history.

(56) References Cited

U.S. PATENT DOCUMENTS

| 7,958,287 B2* | 6/2011 | Tanaka ................. G06F 3/0611 710/66 |
| 2005/0210216 A1* | 9/2005 | Jobs ..................... G06F 13/1678 711/170 |
| 2006/0161698 A1* | 7/2006 | Shen .................... G06F 13/1678 710/52 |
| 2008/0195837 A1 | 8/2008 | Ishii et al. |
| 2013/0007398 A1* | 1/2013 | Auernhammer ........ G06F 13/16 711/165 |
| 2014/0101354 A1* | 4/2014 | Liu ...................... G06F 13/1684 710/308 |
| 2016/0103778 A1* | 4/2016 | Lesartre ................ G06F 9/467 711/172 |
| 2017/0285941 A1* | 10/2017 | Nale ....................... G06F 13/16 |
| 2017/0285992 A1* | 10/2017 | Vogt ....................... G06F 13/16 |
| 2017/0357581 A1* | 12/2017 | Yanagidaira ............ G06F 13/16 |
| 2019/0073324 A1* | 3/2019 | Ringe ................. G06F 13/4018 |

FOREIGN PATENT DOCUMENTS

JP 2008-197804 A 8/2008
JP 2016-181126 A 10/2016

* cited by examiner

*Primary Examiner* — Glenn A. Auve
(74) *Attorney, Agent, or Firm* — Fujitsu Patent Center

(57) ABSTRACT

A data transmission apparatus that transmits transmission data from a first memory to a second memory through a communication channel, the first memory storing data in units of a first data block of a first data size, and the communication channel having a width of a second data size, includes: a storage that stores the transmission data read from the first memory; and a transmission controller that transmits the transmission data stored in the storage from the first memory to the second memory in units of an integral multiple of the second data size, such that data transmission from the first memory to the second memory is efficiently performed.

4 Claims, 11 Drawing Sheets

DATA TRANSMISSION APPARATUS AND DATA TRANSMISSION METHOD

CROSS-REFERENCE TO RELATED APPLICATION

This application is based upon and claims the benefit of priority of the prior Japanese Patent application No. 2017-222120, filed on Nov. 17, 2017, the entire contents of which are incorporated herein by reference.

FIELD

The embodiment discussed herein is directed to a data transmission apparatus and a data transmission method.

BACKGROUND

For example, in a storage apparatus including a plurality of controller modules (CMs), transmission of data of a memory of one CM to another CM using a direct memory access (DMA) has been conducted.

In addition, a multi-core processor having a plurality of cores may be used as a central processing unit (CPU) included in the CM.

FIG. 11 is a view for describing conventional data transmission using a DMA in a storage apparatus including a controller module (CM) mounted with a multi-core processor.

The storage apparatus 500 illustrated in FIG. 11 includes two CMs 501-1 and 501-2. These CMs 501-1 and 501-2 have the same configuration. Hereinafter, reference numerals 501-1 and 501-2 are used as a reference numeral of the CM when one of a plurality of CMs needs to be specified, but reference numeral 501 is used as a reference numeral of the CM when any CM is designated.

Each CM 501 includes a CPU 502, a memory 503, a switch 504, and a DMA controller 505.

The CPU 502 is a multi-core processor having a plurality of cores 5011, and the memory 503 is connected to the CPU 502. In the storage apparatus 500 illustrated in FIG. 11, each CM 501 has four cores 5011. Hereinafter, these cores 5011 may be represented using signs #0 to #3.

The switch 504 is connected to the CPU 502, and a switch 504 of the other CM 501 is connected to the switch 504. That is, the CM 501-1 and the CM 501-2 are communicably connected to each other through the switches 504 and 504. These switches 504 are connected to each other through, for example, a communication channel according to a standard of peripheral component interconnect express (PCIe).

In addition, in each CM 501, the DMA controller 505 is connected to the switch 504. The DMA controller 505 transmits data between, for example, the memory 503 of the CM 501-1 and the memory 503 of the CM 501-2.

In the CPU 502 which is the multi-core processor, one DMA controller 504 is provided for a plurality of CPU cores 5011.

In addition, a CPU 502 of a transmission source CM501 performs confirmation of consistency of storage data. The consistency confirmation is performed for each data block, such that a check code used for consistency confirmation is added to each data block.

[Patent Literature 1] Japanese Laid-open Patent Publication No. 2016-181126

[Patent Literature 2] Japanese Laid-open Patent Publication No. 2008-197804

In the storage apparatus 500, the data block with the check code for the consistency confirmation has a data size of 520 B (bytes) in which a check code of 8 B is added to a user data of 512 B. Hereinafter, the data block with the check code for the consistency confirmation may be referred to as a data block with a check code. Hereinafter, a unit "Byte" of a data size may be simply represented as "B".

On the other hand, a max payload size (MPS) of the PCIe used for communication between the CMs 501 is 256 B, and a data size having the highest transmission efficiency in the PCIe is an integral multiple of 256 B.

As described above, unit sizes of data handled in the data block with the check code and the standard of the PCIe do not coincide with each other.

For example, efficient data transmission performed in the data block with the check code, that is, data transmission in units of 520 B is inefficient in the PCIe, and maximum bus performance is unable to be exhibited.

In a data block which has a data size of 520 B and of which the consistency is confirmed, data is transmitted three times at each data size of 256 B-256 B-8 B between the CMs 501. Therefore, particularly at the time of transmitting data corresponding to the data size of the last 8 B, bus use efficiency of the PCIe is deteriorated.

SUMMARY

According to an aspect of the embodiments, a data transmission apparatus that transmits transmission data from a first memory to a second memory through a communication channel, the first memory storing data in units of a first data block of a first data size, and the communication channel having a width of a second data size, includes: a storage that stores the transmission data read from the first memory; and a transmission controller that transmits the transmission data stored in the storage from the first memory to the second memory in units of an integral multiple of the second data size.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
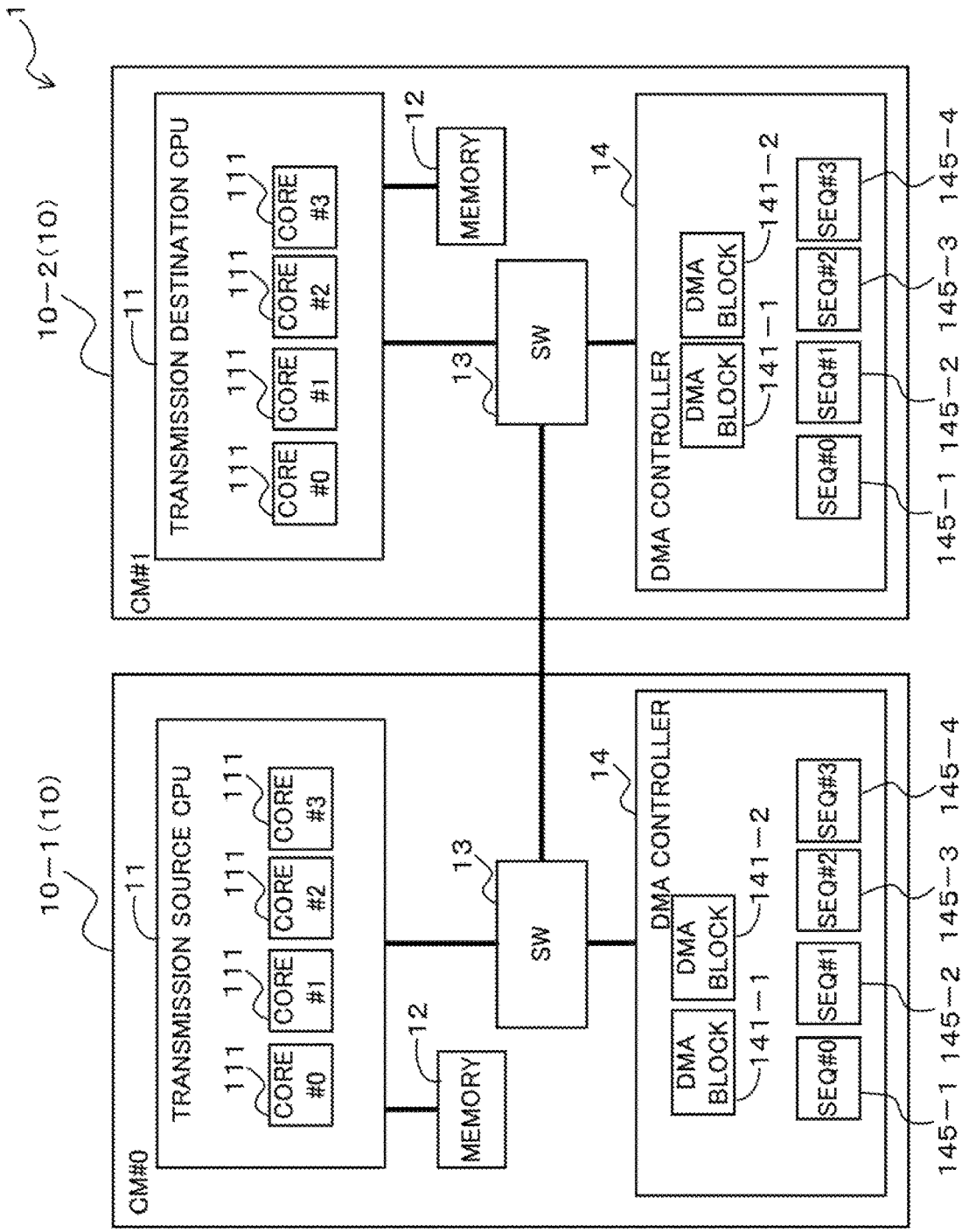
FIG. 1 is a view illustrating a hardware configuration of a storage apparatus as an example of an embodiment.

Hereinafter, embodiments of a data transmission apparatus and a data transmission method will be described with reference to the drawings. However, the following embodiments are only an example, and there is no intention to exclude the application of various modifications and techniques that are not explicitly stated in the following embodiments. That is, the present embodiment is able to be variously modified without departing from the gist thereof. In addition, each drawing is not intended to include only components illustrated in the drawing, but is able to include other functions and the like.

(A) Configuration

First, a hardware configuration of a storage apparatus 1 including storage control apparatuses (CM) 10-1 and 10-2 according to the present embodiment will be described with reference to FIG. 1. FIG. 1 is a block view illustrating an example of the hardware configuration of the storage apparatus 1 including the storage control apparatuses 10-1 and 10-2 according to the present embodiment.

The storage apparatus 1 virtualizes a storage device (not illustrated) such as a hard disk drive (HDD) to form a virtual storage environment. The storage apparatus 1 provides a virtual volume to a host apparatus (not illustrated), which is a higher apparatus.

The storage apparatus 1 is communicably connected to one or more host apparatuses. The host apparatus is, for example, an information processing apparatus having a server function, and transmits and receives a command of a network attached storage (NAS) or a storage area network (SAN) to and from the storage apparatus 1. The host apparatus transmits, for example, a storage access command such as read/write in the NAS to the storage apparatus 1 to write or read data to or from the volume provided by the storage apparatus 1.

In a storage device of the storage apparatus 1, data is stored as a storage block having a block size of 520 B by adding matching information of 8 B calculated based on block data per block data of 512 B. Hereinafter, the matching information may be referred to as a block check code (BCC).

The storage apparatus 1 performs a process such as write or read of data on the storage device corresponding to the volume in response to an input or output request (for example, a write request or a read request) performed on the volume from the host apparatus. The input or output request from the host apparatus may be referred to an I/O request.

The storage apparatus 1 includes a plurality of (two in the present embodiment) CMs 10-1 and 10-2, as illustrated in FIG. 1. These CMs 10-1 and 10-2 may be mounted in a controller enclosure (CE) (not illustrated).

The CMs 10-1 and 10-2 are control apparatuses (controllers or storage control apparatuses) that control operations in the storage apparatus 1, and perform various controls such as a data access control to the storage device depending on the I/O request transmitted from the host apparatus. In addition, the CMs 10-1 and 10-2 have the same configuration. Hereinafter, reference numerals 10-1 and 10-2 are used as a reference numeral of the CM when one of the plurality of CMs is specified, and reference numeral 10 is used as a reference numeral of the CM when any CM is designated. In addition, the CM 10-1 may be represented as CM #0, and the CM 10-2 may be represented as CM #1.

The CMs 10-1 and 10-2 are made redundant. One CM 10 (for example, the CM 10-1) of the plurality of CMs 10 included in the storage apparatus 1 performs various controls as a master (primary). In addition, the remaining CM 10 (for example, the CM 10-2) functions as a slave. When the master CM 10 fails, the slave CM 10 takes over an operation as a master.

Each CM 10 includes a central processing unit (CPU) 11, a memory 12, a switch 13, and a DMA controller 14.

The memory 12 is, for example, a random access memory (RAM), and data and the like of the storage device of the storage apparatus 1 are temporarily stored in the memory 12. Therefore, the memory 12 stores data in units of a storage block (first data block) of a first data size (520 B).

The CPU 11 is a multi-core processor having a plurality of cores 111, and the memory 12 is connected to the CPU 11. In the storage apparatus 1 illustrated in FIG. 1, each CM 10 has four cores 111. Hereinafter, these cores 111 may be represented using #0 to #3.

The respective cores 111 issue requests to sequencers (SEQs) 145-1 to 145-4 included in a DMA controller 14 to be described below. For example, the core 111 issues a request for instructing the sequencer 145 included in the DMA controller 14 so as to correspond to each core 111 to transmit data from the memory 12 included in one CM 10 to the memory 12 included in the other CM 10.

The core 111 issues the request to the sequencer 145 based on, for example, a descriptor (instruction) prepared by an application.

The switch (SW) 13 is connected to the CPU 11, and a switch 13 of the other CM 10 is connected to the switch 13. That is, the CM 10-1 and the CM 10-2 are communicably connected to each other through the switches 13. The switch 13 and the CPU 11, the switch 13 and the DMA controller 14, and the switches 13 are connected to each other, respectively, through, for example, a communication channel (PCIe bus) according to a standard of peripheral component interconnect express (PCIe).

In addition, in each CM 10, the DMA controller 14 is connected to the switch 13. The DMA controller 14 transmits data between, for example, the memory 12 of the CM 10-1 and the memory 12 of the CM 10-2. That is, the DMA controller 14 performs a control to read the data of the memory 12 of the CM 10-1 of a transmission source (read source) and write the read data to the memory 12 of the CM 10-2 of a transmission destination (write destination).

The DMA controller 14 includes a plurality of (four in an example illustrated in FIG. 1) sequencers 145-1 to 145-4 and one or more (two in the example illustrated in FIG. 1) DMA blocks 141-1 and 141-2, as illustrated in FIG. 1.

Hereinafter, reference numerals 145-1 to 145-4 are used as a reference numeral of the sequencer when one of the plurality of sequencers needs to be specified, but reference numeral 145 is used as a reference numeral of the sequencer when any sequencer is designated. In addition, hereinafter, reference numerals 141-1 and 141-2 are used as a reference numeral of the DMA block when one of a plurality of DMA blocks needs to be specified, but reference numeral 141 is used as a reference numeral of the DMA block when any DMA block is designated. In addition, hereinafter, the DMA block 141 may be represented as DMA_BLK.

Hereinafter, the sequencer 145 may be represented as SEQ 145. In addition, hereinafter, the sequencer 145-1 may be represented as sequencer #0 or SEQ #0. Likewise, the sequencers 145-2 to 145-4 may be represented as sequencers #1 to #3 or SEQ #1 to SEQ #3.

In the storage apparatus 1, the DMA controller 14 is provided with sequencers 145 of which the number is the same as that of CPU cores 111 in the CPU 11, and the sequencers #0 to #3 perform processes corresponding to the cores #0 to #3, respectively.

The sequencer 145 handles data in units of a predetermined processing size. For example, in the case of performing data transmission, the sequencer 145 handles data read by a read DMA 143 (see FIG. 3) to be described below in units of a predetermined processing size (for example, 2 KB to 4 KB). In addition, the sequencer 145 handles write data in units of a predetermined processing size (for example, 1 KB), divides the write data into a predetermined transmission size (for example, an integral multiple of a max payload size (MPS)), and sends out (writes) the divided write data through a write DMA 142 (see FIG. 3) to be described below.

For example, when transmitting a data of 4 KB (0x0001_0000) size from an address 0x0000_0100, the sequencer 145 divides the data into two data at an address of 4 KB and sends out the divided two data. That is, a data of a size 0x0000_FF00 is transmitted as a first data from an address 0x0000_0100, and a data of a size 0x0000_0100 is then transmitted as a second data from an address 0x0001_0000.

The sequencer 145 divides the transmission data in, for example, units of a predetermined size (MPS (=256 B)) and transmits the divided transmission data to the write DMA 142, and divides the transmission data in units of a transmission size (integral multiple of the MPS) and transmits (sends out) the divided transmission data to the write DMA 142.

In addition, the DMA controller 14 is provided with DMA blocks 141 of which the number is less than that of sequencers 145, such that a reduction in a manufacturing cost and miniaturization of the storage apparatus are realized.

Figure 2:
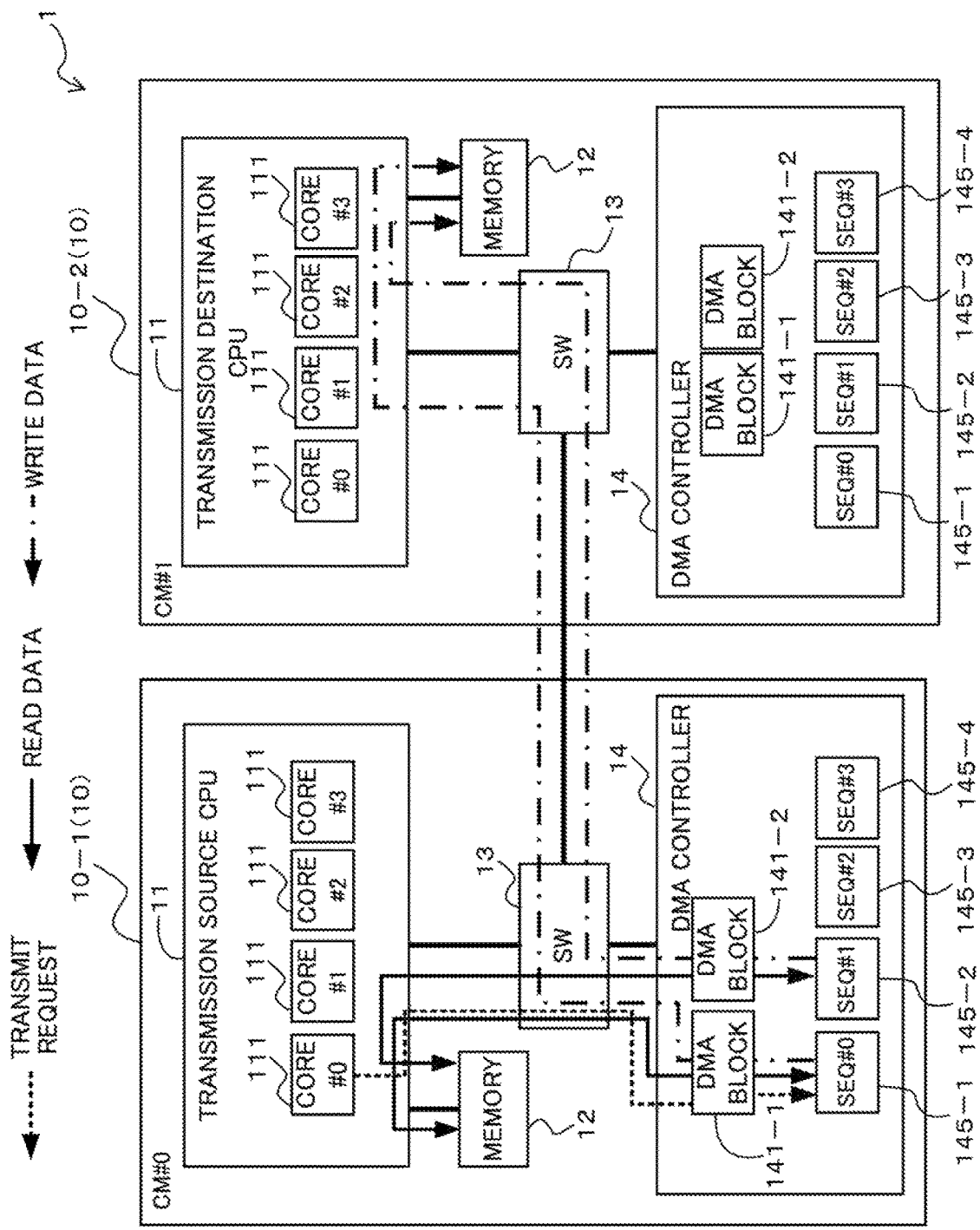
FIG. 2 is a view illustrating data transmission between memories in the storage apparatus as an example of the embodiment.

FIG. 2 is a view illustrating data transmission between memories 12 in the storage apparatus 1 as an example of the embodiment.

In the example illustrated in FIG. 2, an example of transmitting data of the memory 12 of the CM (transmission source CM) 10-1 to the memory 12 of the CM (transmission destination CM) 10-2 is illustrated.

In the transmission source CM 10-1, the core #0 transmits a data transmission request to the sequencer 145-1 (sequencer #0). The sequencer 145-1 receiving the data transmission request causes the DMA block 141-1 to read the data from the memory 12. Then, the sequencer 145-1 causes the DMA block 141-1 to write the read data to the memory 12 of the transmission destination CM 10-2.

Likewise, the core #1 transmits a data transmission request to the sequencer 145-2 (sequencer #1). The sequencer 145-2 receiving the data transmission request causes the DMA block 141-2 to read the data from the memory 12. Then, the sequencer 145-2 causes the DMA block 141-2 to write the read data to the memory 12 of the transmission destination CM 10-2.

In the storage apparatus 1, the CPU 11, the memory 12, the switch 13, and the DMA controller 14 are connected to one another by the communication channel according to the standard of the PCIe. That is, the CM 10 functions as a data transmission apparatus that transmits the transmission data through a communication channel having a width of a second data size (256 B).

Figure 3:
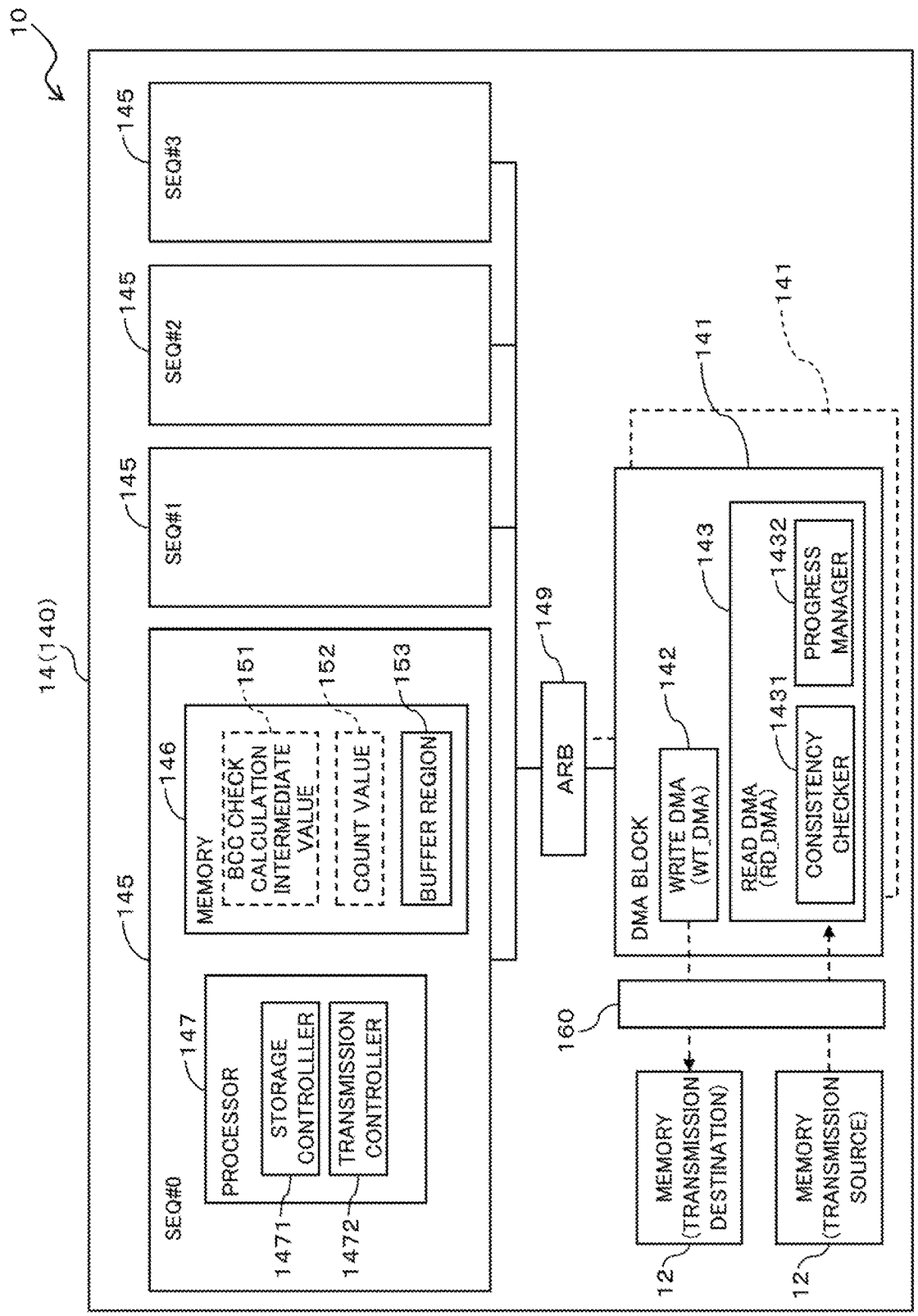
FIG. 3 is a view illustrating a functional configuration of a direct memory access (DMA) controller of the storage apparatus as an example of the embodiment.

FIG. 3 is a view illustrating a functional configuration of a DMA controller 14 of the storage apparatus 1 as an example of the embodiment.

In FIG. 3, only a configuration of the sequencer #0 is illustrated for convenience, but other sequencers 145 have the same configuration as that of the sequencer #0. Likewise, in FIG. 3, only a configuration of one DMA block 141 is illustrated for convenience, but the other DMA block 141 has the same configuration as that of one DMA block 141.

Each DMA block 141 is connected to each sequencer 145 through an arbiter (ARB) 149, as illustrated in FIG. 3. In addition, each DMA block 141 is connected to the switch 13 through a PCIe controller 160, such that each DMA block 141 is connected to each of the memories 12 of CM #0 and CM #1 through the PCIe controller 160.

The arbiter 149 is a an arbiter that controls connection between the plurality of sequencers 145 and the DMA blocks 141, and switches the sequencer 145 connected to the DMA block 141.

As described above, in each DMA controller 14 of the storage apparatus 1, the number of DMA blocks 141 is less than that of sequencers 145. The arbiter 149 switches the sequencer 145 connected to the DMA block 141, such that each sequencer 145 is able to realize data transmission between the memories 12 through the DMA block 141.

Hereinafter, the sequencer 145 connected to the DMA block 141 may be referred to as a sequencer 145 during DMA connection. In addition, the arbiter 149 switches the sequencer 145 connected to the DMA block 141, such that the sequencer 145 changed from a state during DMA connection into a state in which it is no longer connected to the DMA block 141 may be referred to as a sequencer 145 of which DMA connection is released.

In an example illustrated in FIG. 3, one arbiter 149 is illustrated for convenience, but the number of arbiters 149 is not limited thereto. For example, the arbiter 149 may be provided per DMA block 141, and is able to be appropriately modified.

For example, when one sequencer 145 transmits a data of a predetermined size (for example, 4 KB) through one DMA block 141, the arbiter 149 switches the sequencer 145 connected to the corresponding DMA block 141.

In the DMA controller 14, SEQ #0 to SEQ #3, the arbiter 149, and the DMA blocks 141 may be provided on the same large scale integration (LSI) 140.

The arbiter 149 functions as a switching controller that switches a sequencer 145 occupying the DMA block 141 to perform a transmission instruction among the plurality of sequencers 145.

The DMA block 141 includes a write DMA 142 and a read DMA 143, as illustrated in FIG. 3. The write DMA may be represented as WT_DMA, and the read DMA may be represented as RD_DMA.

The read DMA 143 reads the data from the memory 12 of the transmission source (read source). The read DMA 143 reads the data from the memory 12 of the transmission source (read source) depending on an instruction from the sequencer 145. Various known methods are able to be used to read the data from the memory 12 by the read DMA 143, and a detailed description thereof will be omitted.

The read DMA 143 transmits (reads) the data from the memory 12 of the transmission source in units of a data size at which transmission efficiency is good on the PCIe bus, which is a data transmission channel, depending on an instruction from a transmission controller 1472 of the sequencer 145. Here, the data size at which the transmission efficiency is good on the PCIe bus is, for example, a max payload size (MPS), which is a data size of data able to be transmitted at one time in the PCIe, and is specifically 256 B.

Hereinafter, a unit of the data size at which the transmission efficiency is good on the PCIe bus may be referred to as a PCIe transmission appropriate size, and it is assumed to be an integral multiple of 256 B.

The read DMA 143 performs transmission in units of the integral multiple (a second data size) of 256 B, which is the PCIe transmission appropriate size, on a data transmission channel connecting the read DMA 143 and the memory 12 of the transmission source to each other.

The read DMA 143 includes a memory (buffer memory) (not illustrated), and stores the data read from the memory 12 of the transmission source in this memory. The read DMA 143 reads the data from the memory 12 of the transmission source depending on an instruction from a sequencer 145 to be described below.

In addition, the read DMA 143 includes a consistency checker 1431 and a progress manager 1432.

The consistency checker 1431 sequentially performs calculation for confirming consistency of a value of a BCC included in the storage block on the data (storage block) received in units of a predetermined size (for example, 520 B). For example, the BCC may be set by another storage device or the like by a checksum method of calculating the BCC using a remainder (surplus) obtained by dividing a sum obtained by regarding a data block as a sequence of integer values by any constant. In this case, the consistency checker 1431 calculates a BCC by the checksum method using the data block included in the storage block and performs confirmation of consistency (validity) on whether the calculated BCC coincides with the BCC included in the storage block.

Hereinafter, confirmation of the consistency of a value of the BCC included in the storage block with respect to the storage block may be referred to as consistency check or BCC check.

The consistency checker 1431 may perform the BCC check using the known method according to the American National Standards Institute (ANSI) T10 data integrity field (DIF) standard. The BCC check by the consistency checker 1431 may be performed using various known methods, and a detailed description thereof will be omitted.

The consistency checker 1431 functions as a consistency confirmer that confirms the consistency of the transmission data using the BCC (matching information).

As described above, the BCC check is performed on the transmitted data by the consistency checker 1431, such that it is possible to detect an error of data even when data destruction, data garbling or the like, occurs in the storage.

Hereinafter, a value calculated in a process in which the consistency checker 1431 performs the BCC check, that is, a calculated value created in a process of BCC check calculation for performing the BCC check may be referred to as a BCC check calculation intermediate value. The BCC check calculation intermediate value is frequently changed depending on the progress of transmission of the data.

The consistency checker 1431 stores the BCC check intermediate value calculated in a process of the consistency check in a predetermined region of the memory (not illustrated) described above. In addition, in the case of performing BCC check calculation, the consistency checker 1431 stores a count value indicating the progress of the BCC check calculation in a predetermined region of the memory (not illustrated). The count value is frequently updated depending on the progress of the BCC check calculation. Therefore, the BCC check calculation intermediate value is changed depending on the count value.

The progress manager 1432 manages the progress of the BCC check by the consistency checker 1431. For example, the progress manager 1432 counts an amount of data of which the consistency is able to be confirmed by the consistency checker 1431. By referring to the value (count value) counted by the progress manager 1432, the consistency checker 1431 performs the BCC check, such that it is possible to grasp a data size of which the consistency is able to be confirmed.

The progress manager 1432 stores the counted count value (progress information) in a predetermined region of the memory (not illustrated).

The read DMA 143 transmits the read (received) storage block of 520 B (first data size) to the sequencer 145 depending on an instruction from the sequencer 145. The transmission of the read data from the read DMA 143 to the sequencer 145 is performed in units of a data size (for example, an integer multiple of 256 B; second data size) according to the standard of the PCIe.

In addition, the sequencer 145 connected to the DMA block 141 may be switched by the arbiter 149 during the transmission of the storage block of 520 B from the read DMA 143 to the sequencer 145.

As described above, when the sequencer 145 connected to the DMA block 141 is switched during the transmission of the storage block, the DMA block 141 interrupts the BCC check that is being executed by the consistency checker 1431. The DMA block 141 transmits the BCC check calculation intermediate value calculated by the consistency checker 1431 to the sequencer 145 before being switched (the sequencer 145 of which the DMA connection is released). In addition, in this case, the read DMA 143 transmits a count value indicating a calculation position of the BCC check calculation intermediate value, together with the BCC check calculation intermediate value, to the sequencer 145 before being switched.

The transmitted count value corresponds to the BCC check calculation intermediate value transmitted together with the count value, and is progress information indicating the progress of the BCC check calculation until the BCC check calculation intermediate value is calculated.

In the case in which the sequencer 145 connected to the DMA block 141 is switched, when a BCC check calculation intermediate value and a count value are received from a newly DMA-connected sequencer 145, the read DMA 143 reads the remaining data using the received count value. In addition, the consistency checker 1431 resumes the consistency check calculation for data for which read is resumed, using the BCC check calculation intermediate value, and calculates the remaining BCC.

The write DMA 142 writes the data to the memory 12 of the transmission destination (write destination). The write DMA 142 writes the transmission data read from the transmission source memory 12 by the read DMA 143 to the memory 12 of the transmission destination (write destination) depending on an instruction of the sequencer 145. A process of writing the data to the memory 12 by the write DMA 142 is known, and a detailed description thereof will be omitted.

The sequencer 145 receives a data transmission instruction issued from the core 111 of the CPU 11, and issues a read instruction of the data from the memory 12 of the transmission source to the DMA block 141 depending on the instruction. In addition, in the DMA controller 14, the number of sequencers 145 is more than that of DMA blocks 141. In a multi-core system, sequencers 145 of which the number corresponds to the number of cores 111 are able to be provided. However, when a large number of DMA blocks 141 are provided, a cost is increased or a circuit scale is increased. Therefore, in the storage apparatus 1, each DMA block 141 is used by resource sharing for the plurality of sequencers 145.

The sequencer 145 functions as a transmission instructor that instructs the DMA block 141 to transmit the transmission data.

The sequencer 145 instructs the DMA block 141 to transmit the data in units of a data size (for example, an integer multiple of 256 B) at which transmission efficiency on a transmission channel between the memories 12 (efficiency as a protocol) becomes a maximum.

As illustrated in FIG. 3, the sequencer 145 includes a processor 147 and a memory 146.

When the sequencer 145 receives the BCC check calculation intermediate value and the count value from the read DMA 143, the sequencer 145 stores the received BCC check calculation intermediate value and count value as a BCC check calculation intermediate value 151 and a count value 152 in the memory 146.

In the case in which a sequencer 145 in a state in which DMA connection is released is again DMA-connected, when the sequencer 145 issues the next data read instruction to a read DMA 143 of a newly connected DMA block 141, the sequencer 145 adds the BCC check calculation intermediate value 151 and the count value 152 read out from the memory 146 to the data read instruction to hand over the BCC check calculation intermediate value 151 and the count value 152 to the read DMA 143.

In addition, the sequencer 145 issues a data write instruction to the write DMA 142 of the DMA block 141 in order to transmit the data read from the memory 12 of the transmission source to the memory 12 of the transmission destination. In this case, it is preferable that the sequencer 145 causes only the data of which the consistency is able to be confirmed by the BCC check to be transmitted.

The BCC check calculation intermediate value 151 and the count value 152 are stored in a storage region of the memory 146. In addition, a portion of the storage region of the memory 146 functions as a buffer region 153.

The BCC check calculation intermediate value 151 is a BCC check calculation intermediate value notified from the DMA block 141 (read DMA 143), and is stored by a storage controller 1471.

The count value 152 is a count value (progress information) notified from the DMA block 141 (read DMA 143), and is stored by the storage controller 1471.

Target data to be transmitted, read from the memory 12 of the transmission source is stored in the buffer region 153. A transmission controller 1472 to be described below stores the target data to be transmitted, read from the memory 12 of the transmission source in the buffer region 153.

The processor 147 controls the entire sequencer 145. The processor 147 may be a multi-processor. The processor 147 may be any one of, for example, a CPU, a micro processing unit (MPU), a digital signal processor (DSP), an application specific integrated circuit (ASIC), a programmable logic device (PLD), and a field programmable gate array (FPGA). In addition, the processor 147 may be a combination of two or more of the CPU, the MPU, the DSP, the ASIC, the PLD, and the FPGA.

The processor 147 implements the functions of the storage controller 1471 and the transmission controller 1472.

The storage controller 1471 controls storage of the count value 152 and the BCC check calculation intermediate value 151 in the memory 146. The storage controller 1471 performs a control to store the count value and the BCC check calculation intermediate value transmitted from the DMA block 141 in the memory 146 when DMA connection of the sequencer 145 (that may be referred to as a self-sequencer 145) executed by oneself is released by the arbiter 149 while the sequencer 145 transmits the data using the DMA block 141 (during DMA connection).

The storage controller 1471 stores the count value transmitted from the DMA block 141 as the count value 152 in the memory 146. In addition, the storage controller 1471 stores the BCC check calculation intermediate value transmitted from the DMA block 141 as the BCC check calculation intermediate value 151 in the memory 146.

The transmission controller 1472 issues instructions to the read DMA 143 and the write DMA 142 to cause the read DMA 143 and the write DMA 142 to execute data transmission to the memory 12 of the transmission destination. For example, the transmission controller 1472 issues a read instruction for causing the read DMA 143 to read data from a predetermined region of the memory 12 of the transmission source to the read DMA 143.

The transmission controller 1472 functions as a transmission controller that transmits the transmission data stored in the buffer region 153 of the memory 146 from the memory 12 of the transmission source to the memory 12 of the transmission destination at the PCIe transmission appropriate size.

The transmission controller 1472 stores the data (transmission data) read from the memory 12 of the transmission source by the read DMA 143 in the buffer region 153 of the memory 146.

In addition, the transmission controller 1472 issues a write instruction for causing the write DMA 142 to write the data (transmission data) read from the memory 12 of the transmission source by the read DMA 143 to a predetermined region of the memory 12 of the transmission destination to the write DMA 142.

The transmission controller 1472 causes the data to be transmitted between the memories 12 in units of a data size (transmission size: for example, an integral multiple of 256 B which is the MPS) at which the transmission efficiency is good on the PCIe bus.

For example, when a data of 1 KB or more is stored in the buffer region 153 of the memory 146, the transmission controller 1472 sends out the data to the write DMA 142 in units of 1 KB (units of a processing size), and causes the data to be divided and sent out in units of an integral multiple of the MPS (=256 B) (units of a transmission size: for example, 1 KB) through the write DMA 142.

In addition, when the sequencer 145 of which the DMA connection is released is again connected (DMA connection state) to the DMA controller 14 to resume the data transmission, the transmission controller 1472 reads out the count value 152 and the BCC check calculation intermediate value 151 stored in the memory 146, and transmits the count value 152 and the BCC check calculation intermediate value 151 to the DMA block 141 (read DMA 143) together with a data read instruction.

Therefore, the read DMA 143 is able to resume the data read (data transmission) interrupted due to the release of the DMA connection and performed before the DMA connection is released from the same position as a position before the DMA connection is released.

The transmission controller 1472 functions as a notifier that notifies the consistency checker 1431 of the BCC check calculation intermediate value 151 and the count value 152 at the time of resuming the transmission after the sequencer is switched together with a transmission resume instruction to the DMA block 141, when the arbiter 149 switches the sequencer 145 occupying the DMA block 141, the BCC check calculation intermediate value 151 and the count value 152 being stored in the memory 146 by the sequencer 145 before being switched and being calculated at the time of interrupting of the BCC check by the consistency checker 1431.

(B) Operation

A data transmission method in the storage apparatus 1 as an example of the present embodiment configured as described above will be described with reference to FIGS. 4 to 6.

Figure 4:
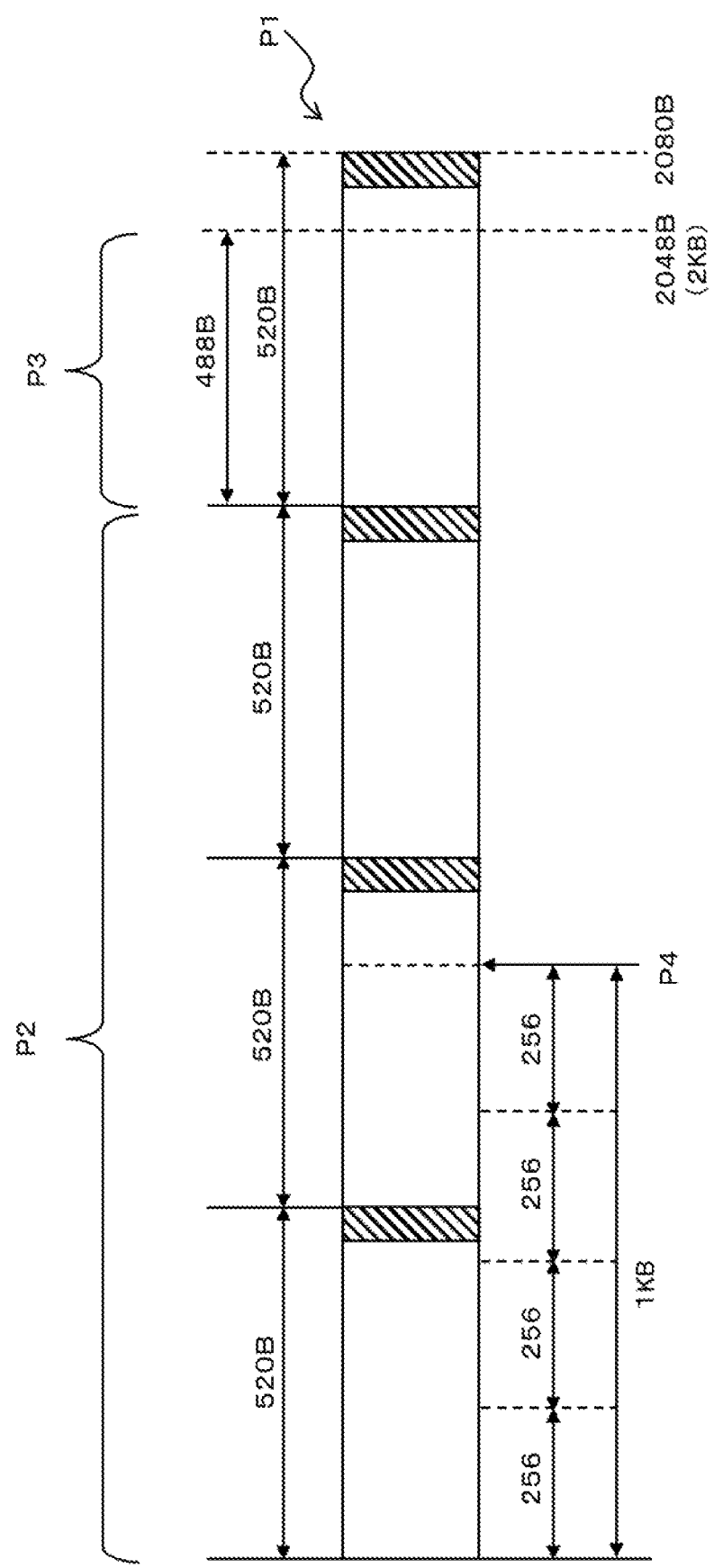
FIG. 4 is a view for describing a processing method of data transmitted by the DMA controller in the storage apparatus as an example of the embodiment.
Figure 5:
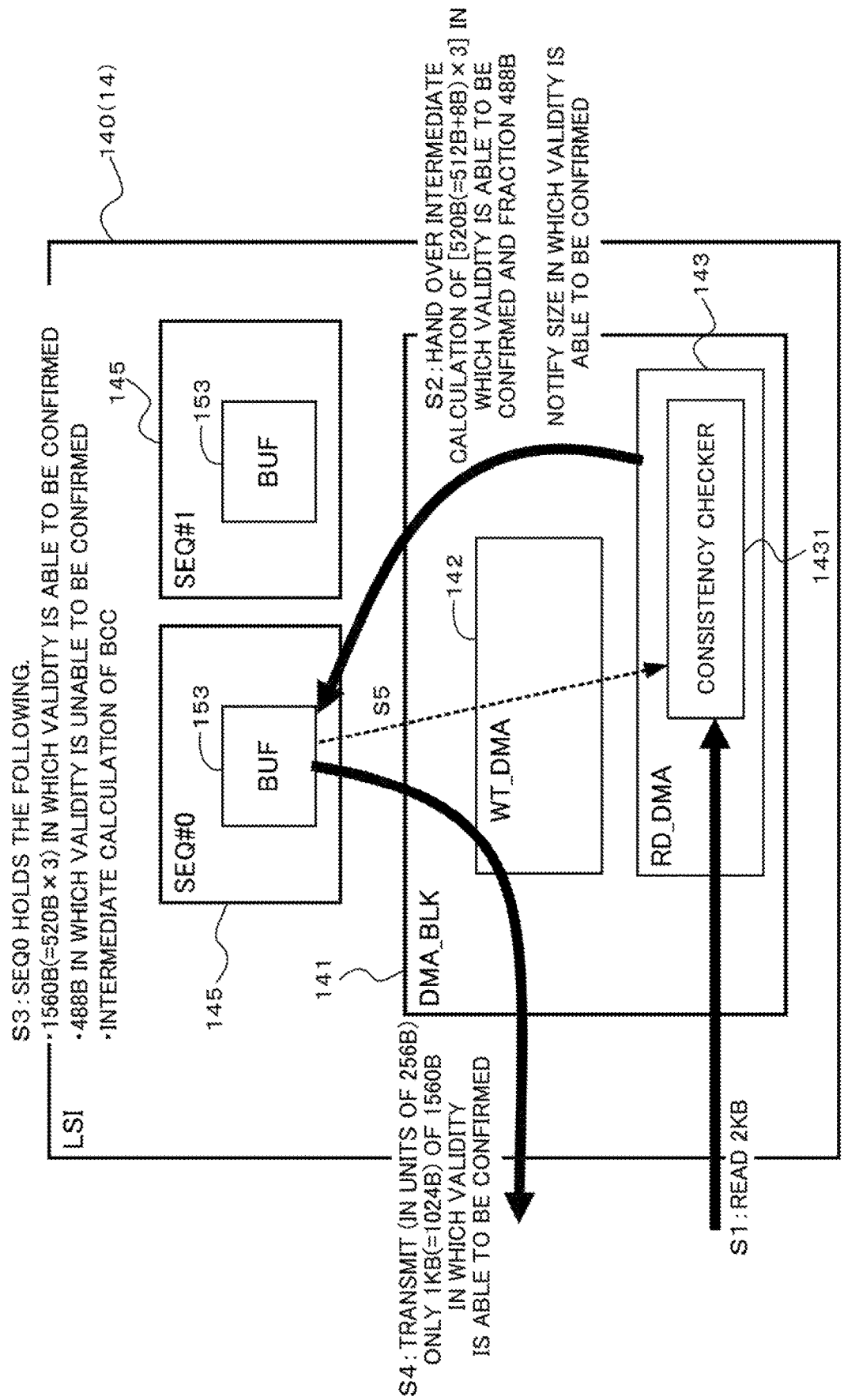
FIG. 5 is a view for describing a flow of data transmitted in the DMA controller in the storage apparatus as an example of the embodiment.
Figure 6:
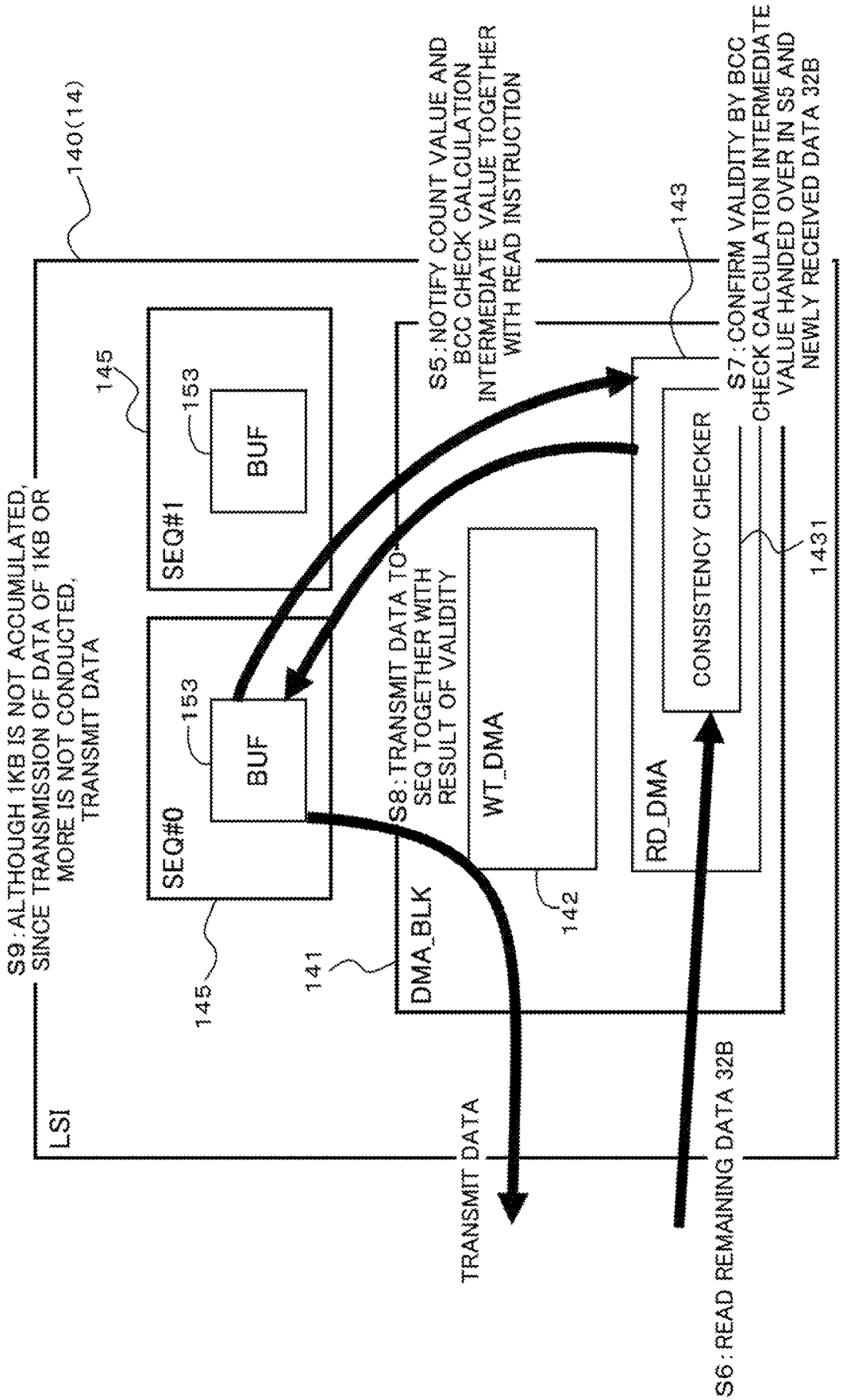
FIG. 6 is a view for describing a flow of data transmitted in the DMA controller in the storage apparatus as an example of the embodiment.

FIG. 4 is a view for describing a processing method of data transmitted by the DMA controller 14 in the storage apparatus 1 as an example of the embodiment. In addition, FIGS. 5 and 6 are, respectively, views for describing a flow of data transmitted in the DMA controller 14.

First, a processing method at the time of data transmission performed by one sequencer 145 (sequencer #0) will be described with reference to FIGS. 5 and 6.

An example illustrated below is an example of transmitting a data corresponding to four storage blocks (520 B×4=2080 B) from the memory 12 of the transmission source to the memory 12 of the transmission destination.

In addition, an example illustrated below is an example in which the sequencer 145 receives read data in units of 2 KB and transmits write data in units of 1 KB. In FIG. 4, hatching (oblique line) is added to the BCC.

The read DMA 143 first reads a data of 2 KB (=2048 B), which is an integral multiple of 256 B, of a transmission data of 2080 B from the memory 12 of the transmission source depending on an instruction from the sequencer #0 (reference numeral S1 of FIG. 5).

In FIG. 4, a transmission data of 2 KB, read from the memory 12 of the transmission source at the beginning, of the transmitted data (see reference numeral P1) corresponding to the four storage blocks is illustrated.

As illustrated in FIG. 4, the transmission data of 2 KB has three storage blocks of 520 B and a data block of 488 B. A BCC of 8 B is added to each of the three storage blocks.

The data read from the memory 12 of the transmission source is input to the consistency checker 1431 in the read DMA 143.

The consistency checker 1431 sequentially performs the BCC check on the read data from a head of the read data. In addition, the consistency checker 1431 performs the BCC check while updating (incrementing) a count value indicating an amount of data for which the BCC check is completed, of the transmitted data, in the case of performing this BCC check.

The read DMA 143 transmits a data corresponding to 2 KB (accurately, 2048 B=520 B×3+488 B), which is the sum of a transmission data (see reference numeral P2 of FIG. 4) of a data size of 520 B×3 (=1560 B) of which consistency is confirmed by completing the BCC check and a transmission data (see reference numeral P3 of FIG. 4) of a size of 488 B of a fraction, to the sequencer #0 (see reference numeral S2 of FIG. 5). The BCC check by the consistency checker 1431 has not been completed yet for the transmission data of the size of 488 B of the fraction.

In addition, in this case, the read DMA 143 also hands over the BCC check intermediate value by the consistency checker 1431 and the count value by the progress manager 1432 to the sequencer #0.

In the sequencer #0, the storage controller 1471 stores a data of 1560 B (=520 B×3) of which consistency is confirmed by the consistency checker 1431 of the DMA block 141 and a data of 488 B (=2048 B−520 B×3) of which consistency is not confirmed in the buffer region 153 of the memory 146. In addition, the storage controller 1471 stores the BCC check calculation intermediate value transmitted from the DMA block 141 as the BCC check calculation intermediate value 151 in the memory 146. In addition, the storage controller 1471 stores the count value transmitted from the DMA block 141 as the count value 152 in the memory 146 (see reference numeral S3 of FIG. 5).

The sequencer #0 causes the write DMA 142 to perform data transmission so as to cause the write DMA 142 to write a data corresponding to 1 KB of the data of 520 B×3 of which the consistency is confirmed in the memory 12 of the transmission destination (see reference numeral P4 of FIG. 4 and reference numeral S4 of FIG. 5). That is, the write DMA 142 writes data in units of a data size (1 KB, accurately, 1024 B=256 B×4) at which transmission efficiency is good on the PCIe bus. Therefore, a data of 1024 B, which is the sum of a data of 536 B (=1560 B−1024 B) of which consistency is confirmed and a data of 488 B of which the consistency is not confirmed, remains in the buffer region 153 of the sequencer #0.

Next, the sequencer #0 notifies the read DMA 143 of the DMA block 141 of the count value and the BCC check calculation intermediate value stored in the sequencer #0, together with a read instruction (see reference numeral S5 of FIG. 6).

The read DMA 143 reads the remaining data of 32 B (=2080 B−2048 B) of the transmission data of 2080 B (=520 B×4) from the memory 12 of the transmission source depending on an instruction from the sequencer #0 (reference numeral S6 of FIG. 6).

The data read from the memory 12 of the transmission source is input to the consistency checker 1431 in the read DMA 143.

The consistency checker 1431 performs the BCC check on the read data using the count value and the BCC check calculation intermediate value notified from the sequencer #0 (see reference numeral S7 of FIG. 6). Therefore, the BCC check is also completed for the transmission data of the size of 488 B of the fraction for which the BCC check was not completed. The read DMA 143 transmits the read data of 32 B together with a result of the BCC check to the sequencer #0 (see reference numeral S8 of FIG. 6).

The sequencer #0 transmits a data of 1024 B stored in the buffer region 153 and the newly read data of 32 B to the write DMA 142 (see reference numeral S9 of FIG. 6). The write DMA 142 transmits a data of 1056 B to the memory 12 of the transmission destination depending on this instruction (see reference numeral S10 of FIG. 6). The data of 1056 B may be transmitted to the memory 12 of the transmission destination in two steps of, for example, 1024 B and 32 B.

In the above example, since a relatively small amount of data such as 2 KB is transmitted, the data is written only once from the write DMA 142 in units of the data size at which the transmission efficiency is good on the PCIe bus (see reference numeral S4 of FIG. 5). However, when a greater amount of data is transmitted, the data is written plural times in units of the data size at which the transmission efficiency is good as described above, such that the entire data transmission efficiency is improved.

Figure 8:
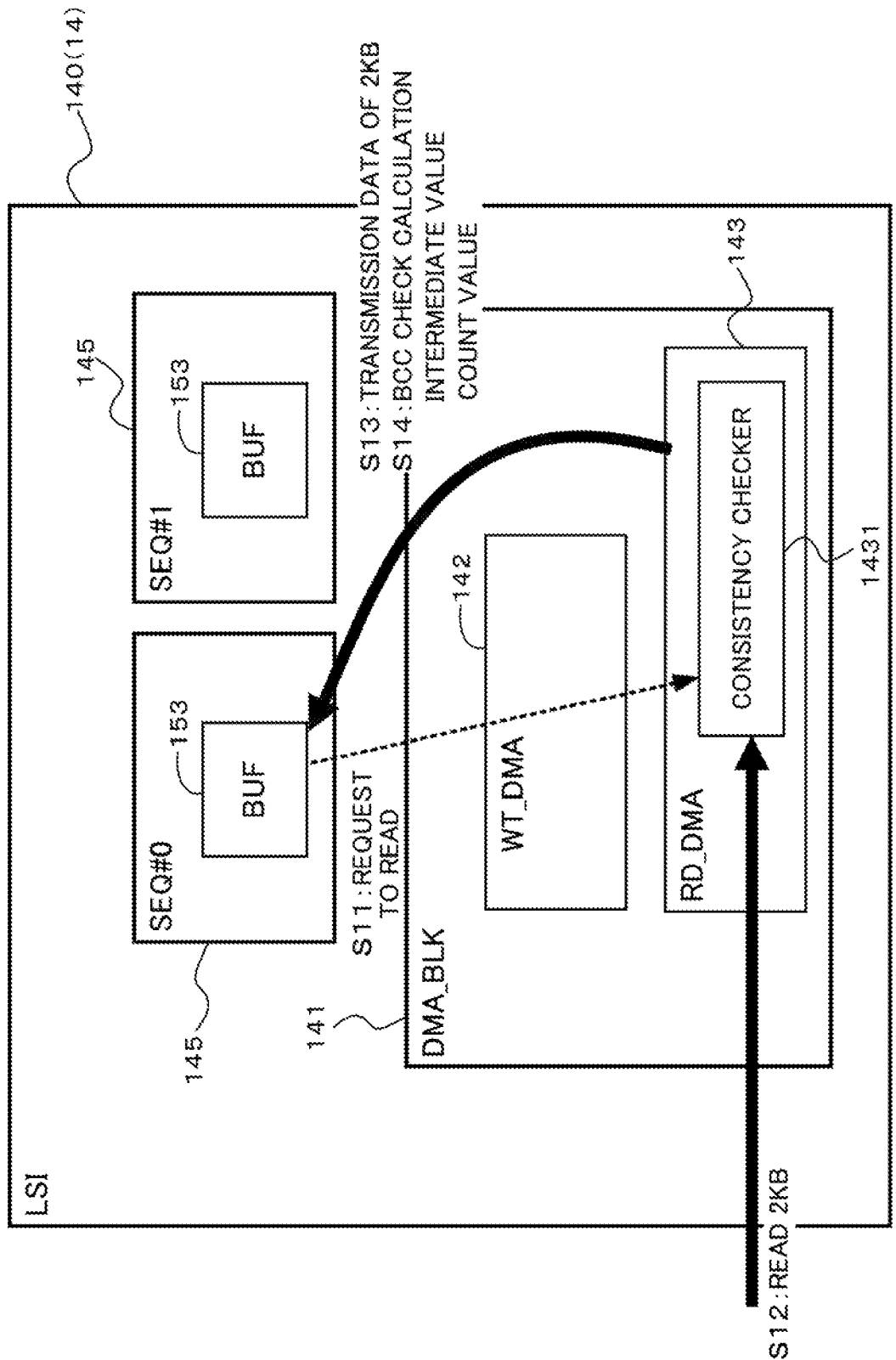
FIG. 8 is a view for describing a flow of data transmitted in the DMA controller in the storage apparatus as an example of the embodiment.
Figure 9:
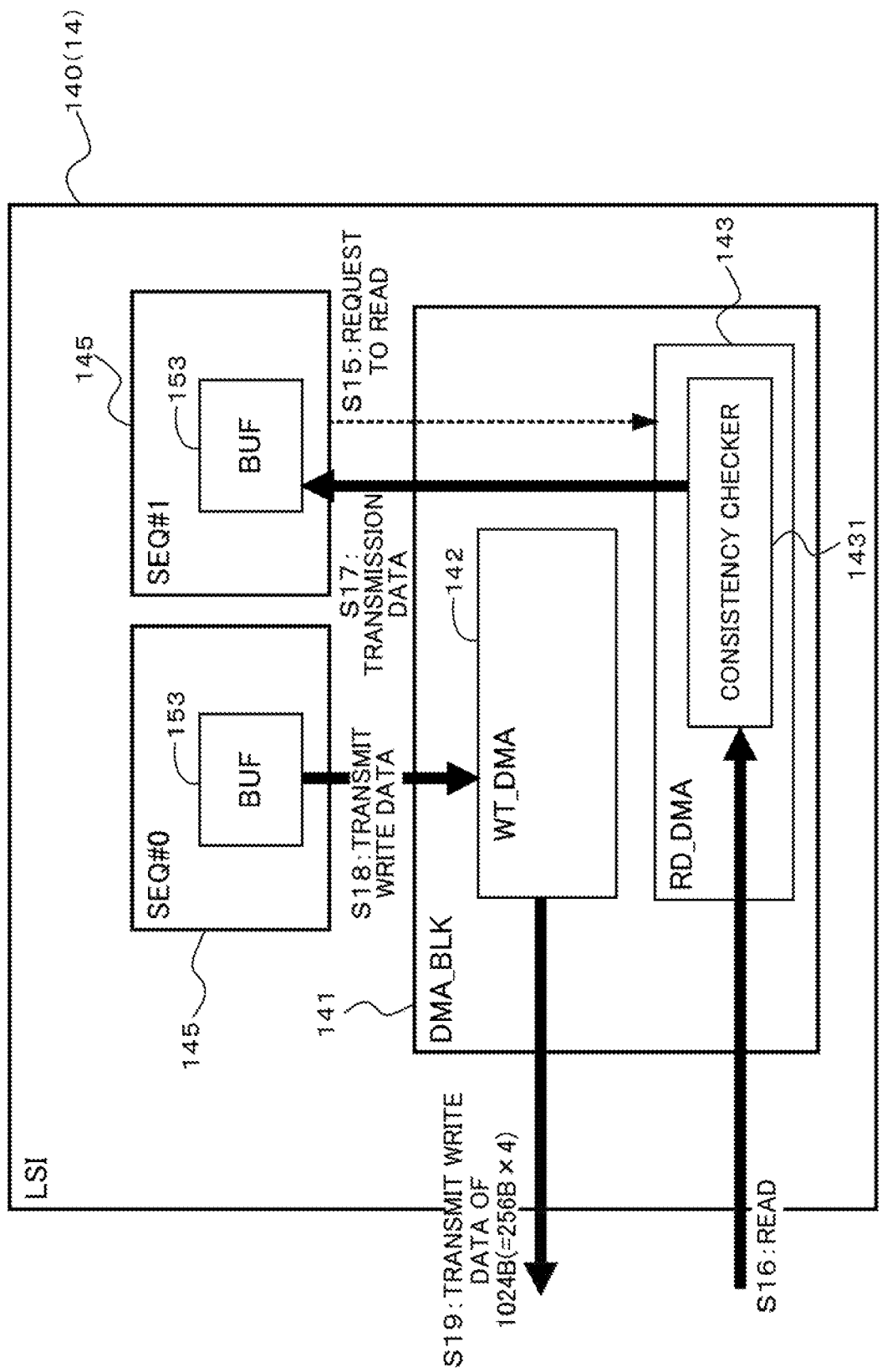
FIG. 9 is a view for describing a flow of data transmitted in the DMA controller in the storage apparatus as an example of the embodiment.
Figure 10:
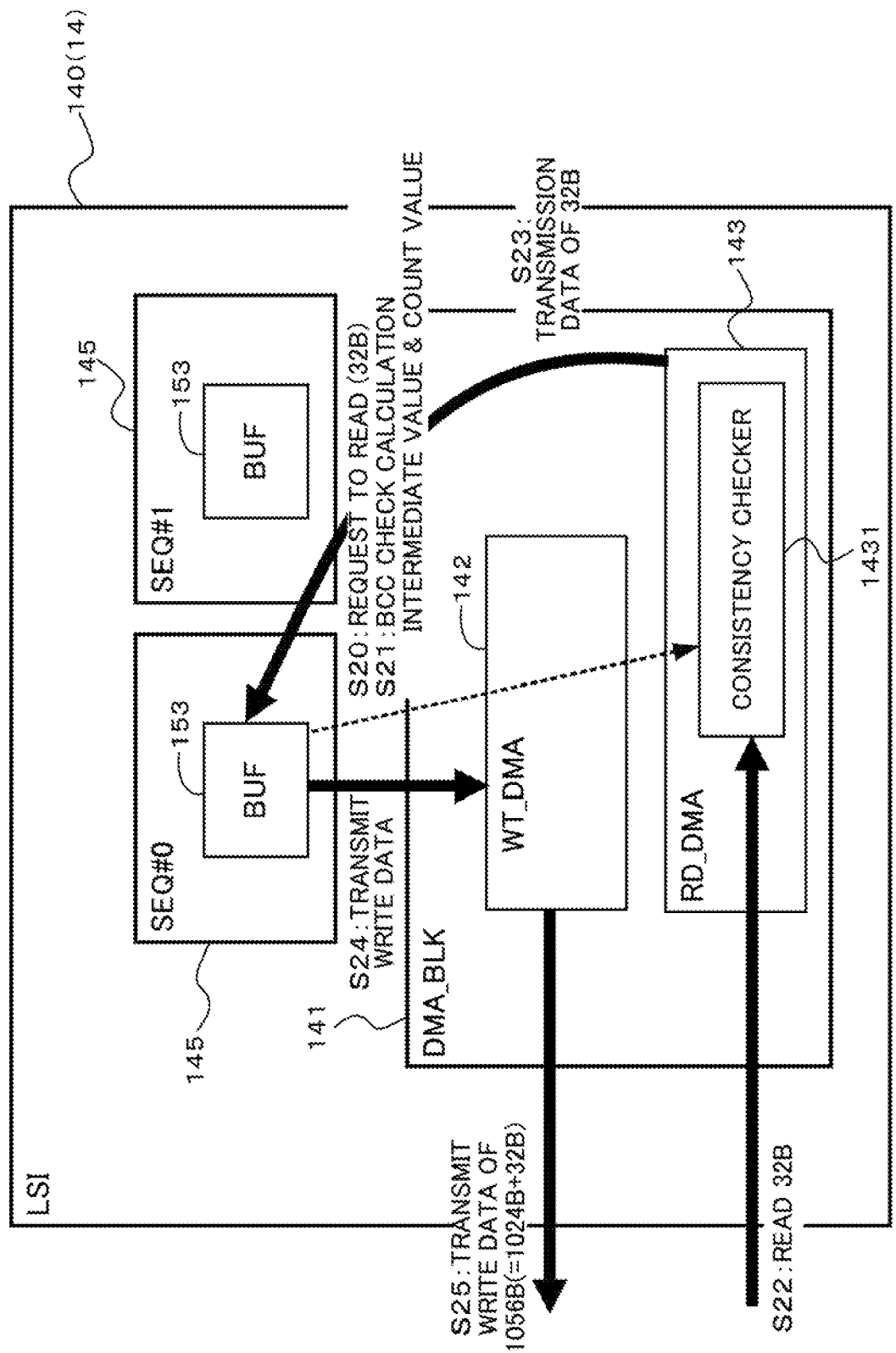
FIG. 10 is a view for describing a flow of data transmitted in the DMA controller in the storage apparatus as an example of the embodiment.
Figure 11:
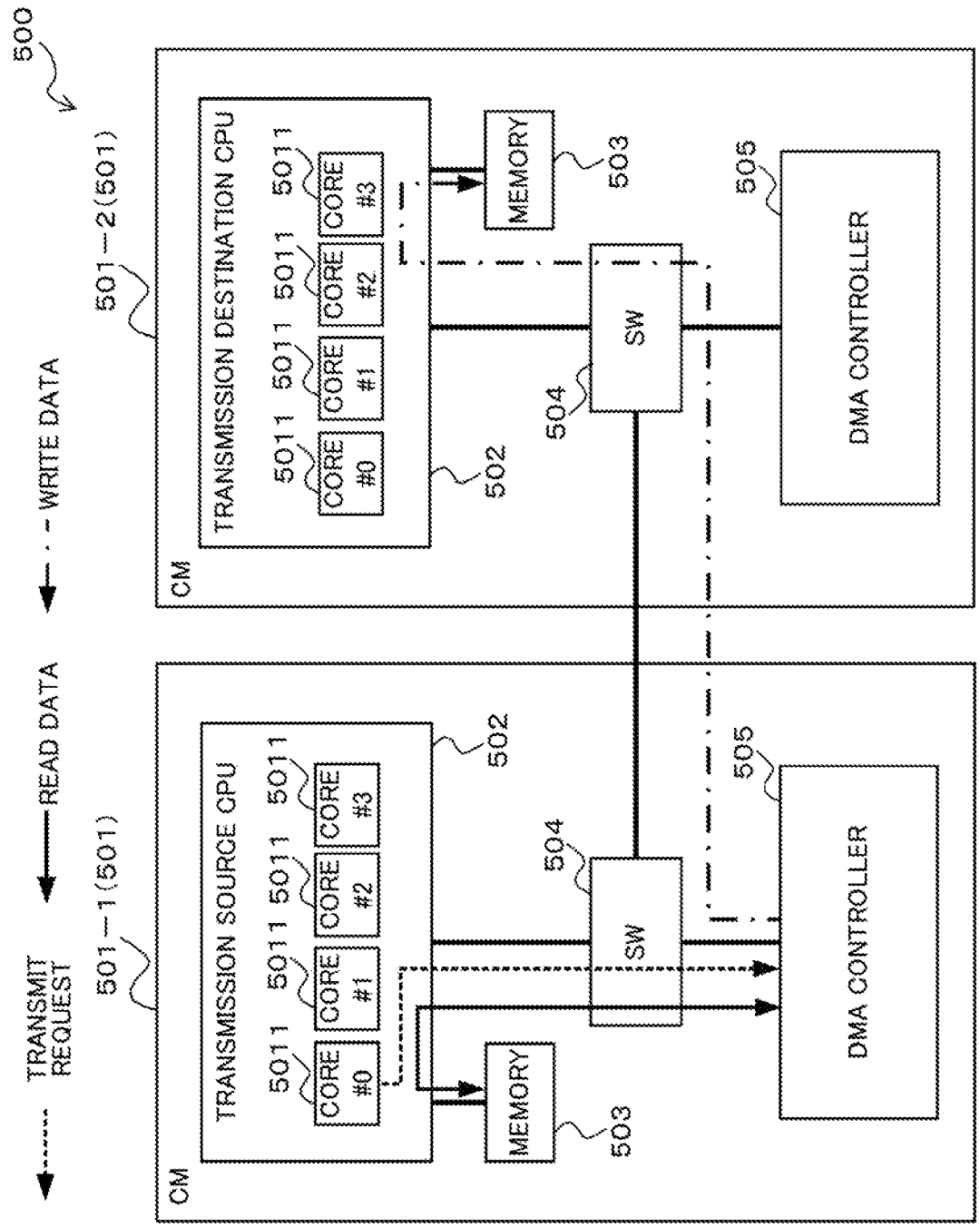
FIG. 11 is a view for describing conventional data transmission using a DMA in a storage apparatus including a controller module (CM) mounted with a multi-core processor.

Next, processes by the CPU 11, the DMA block 141, and the sequencer 145 at the time of data transmission in the storage apparatus 1 as an example of the embodiment configured as described above will be described with reference to a sequence diagram illustrated in FIG. 7 and FIGS. 8 to 10. FIGS. 8 to 10 are, respectively, views for describing a flow of data transmitted in the DMA controller 14.

The example illustrated in FIGS. 7 to 10 also is an example of transmitting a data corresponding to four storage blocks (520 B×4=2080 B) from the memory 12 of the transmission source to the memory 12 of the transmission destination is illustrated. The example illustrated in FIGS. 7 to 10 is an example of switching the sequencer 145 by the arbiter 149 at a point in time in which a data of 2 KB is transmitted.

The CPU 11 kicks each of the sequencer #0 and the sequencer #1 by performing write (register WT) on predetermined registers (SEQ kicks: see reference numerals B1 and B2).

The sequencer #0 and the sequencer #1 request descriptors to the CPU 11, respectively, (see reference numerals B3 and B5). The CPU 11 transmits the descriptors to the sequencer #0 and the sequencer #1, respectively, depending on these requests (descriptor read: see reference numerals B4 and B7).

The sequencer #0 starts to transmit a data of 2 KB depending on the descriptor. That is, the sequencer #0 instructs the read DMA 143 to read the data of 2 KB from the memory 12 of the transmission source (issues a read request) (see reference numeral B6 of FIG. 7 and reference numeral S11 of FIG. 8).

Figure 7:
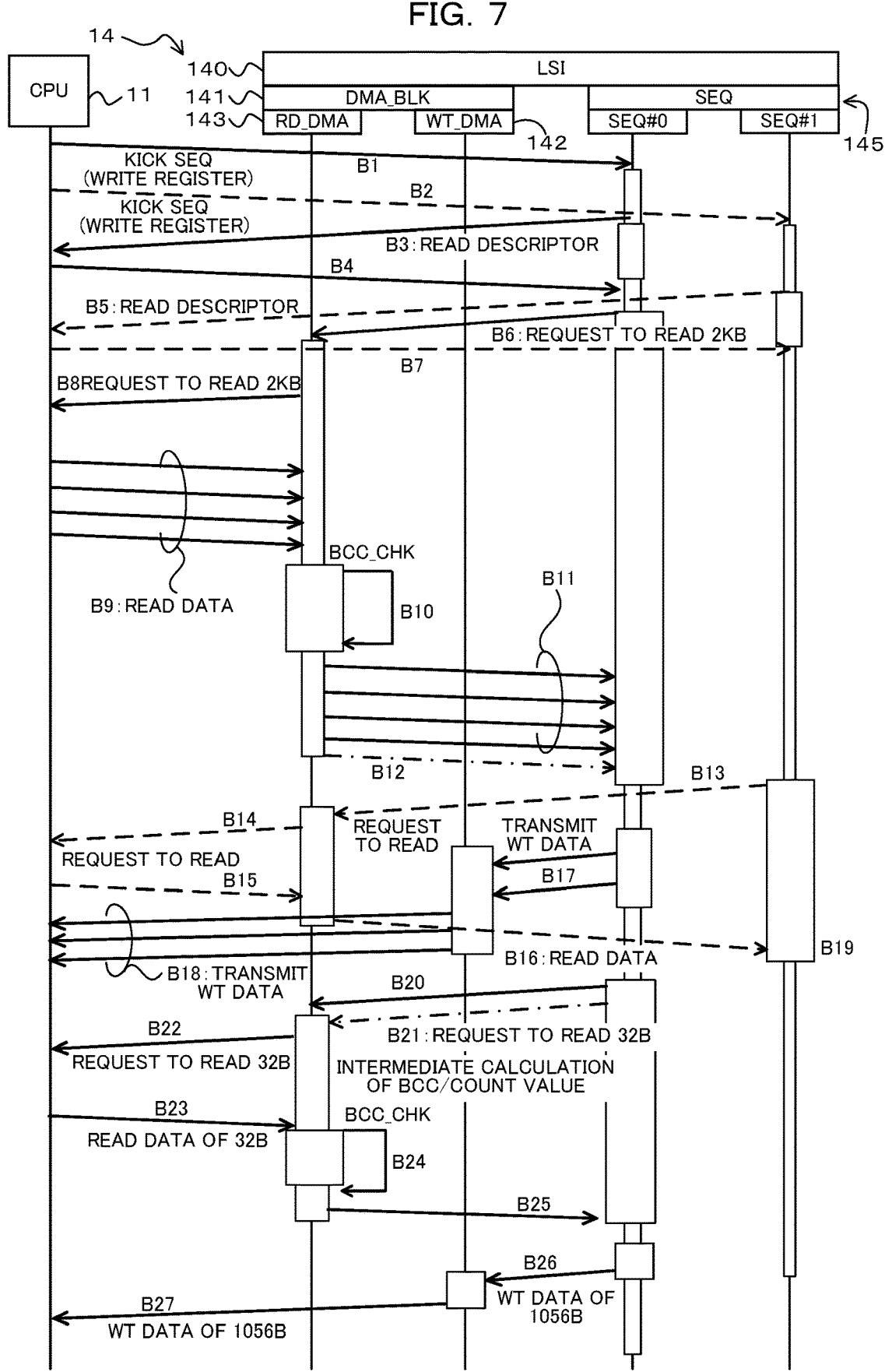
FIG. 7 is a sequence diagram for describing processes by a central processing unit (CPU), a DMA block, and a sequencer at the time of data transmission in the storage apparatus as an example of the embodiment.

The read DMA 143 requests the CPU 11 to read the transmission data of 2 KB from the memory 12 of the transmission source (see reference numeral B8 of FIG. 7). The transmission data is read from the memory 12 of the transmission source through the CPU 11 depending on this read request (see reference numeral B9 of FIG. 7 and reference numeral S12 of FIG. 8).

The consistency checker 1431 of the read DMA 143 performs the BCC check on the received transmission data corresponding to 2 KB (see reference numeral B10 of FIG. 7). As described above, the transmission data of 2 KB includes the three storage blocks of 520 B and the data block of the fraction of a data size halfway from the viewpoint of transmission efficiency on the PCIe bus, such as 488 B. As a result of the BCC check, the consistency of the three storage blocks of 520 B is confirmed (see reference numeral P2 of FIG. 4). The consistency of the data block of the fraction of 488 B is not confirmed (see reference numeral P3 of FIG. 4).

The read DMA 143 transmits the data corresponding to 2 KB (accurately, 2048 B=520 B×3+488 B), which is the sum of the transmission data of the data size of 520 B×3 (=1560 B) of which the consistency is confirmed by completing the BCC check and the transmission data of the size of 488 B of the fraction, to the sequencer #0 (see reference numeral B11 of FIG. 7 and reference numeral S13 of FIG. 8).

The read DMA 143 hands over the BCC check calculation intermediate value and the count value to the sequencer #0 (see reference numeral B12 of FIG. 7 and reference numeral S14 of FIG. 8). In the present embodiment, the counter value is a value indicating 488 B. In addition, in this case, with respect to the three storage blocks receiving the data of 520 B, a result of the BCC check by the consistency checker 1431 and a determination result indicating whether or not the data is a data having consistency are handed over together to the sequencer #0.

In the sequencer #0, the storage controller 1471 stores the data of 1560 B (=520 B×3) of which the consistency is confirmed by the consistency checker 1431 of the DMA block 141 and the data of 488 B (=2048 B−520 B×3) of which the consistency is not confirmed in the buffer region 153 of the memory 146. In addition, the storage controller 1471 stores the BCC check calculation intermediate value transmitted from the DMA block 141 as the BCC check calculation intermediate value 151 in the memory 146. In addition, the storage controller 1471 stores the count value transmitted from the DMA block 141 as the count value 152 in the memory 146.

A data transmission amount by the sequencer #0 reaches a predetermined amount (2 KB), such that the sequencer 145 is switched by the arbiter 149. Resources of the read DMA 143 are released. When the resources of the read DMA 143 are released, the sequencer #1 starts to use the read DMA 143.

The sequencer #1 issues a read request to the read DMA 143 (see reference numeral B13 of FIG. 7 and reference numeral S15 of FIG. 9). The read DMA 143 requests the CPU 11 to read the transmission data from the memory 12 of the transmission source (see reference numeral B14 of FIG. 7). The transmission data is read from the memory 12 of the transmission source through the CPU 11 depending on this read request (see reference numeral B15 of FIG. 7 and reference numeral S16 of FIG. 9). The read transmission data is transmitted from the read DMA 143 to the sequencer #1 (see reference numeral B16 of FIG. 7 and reference numeral S17 of FIG. 9).

The sequencer #0 causes the write DMA 142 to perform data transmission so as to cause the write DMA 142 to write the data corresponding to 1 KB of the data of 520 B×3 of which the consistency is confirmed in the memory 12 of the transmission destination (see reference numeral S18 of FIG. 9). That is, the write DMA 142 writes the data in units of the data size (1 KB, accurately, 1024 B=256 B×4) at which the transmission efficiency is good on the PCIe bus. Therefore, the data of 1024 B, which is the sum of the data of 536 B (=1560 B−1024 B) of which the consistency is confirmed and the data of 488 B of which the consistency is not confirmed, remains in the buffer region 153 of the sequencer #0.

The remaining transmission data of 1024 B is buffered in the sequencer #0. The remaining transmission data of 1024 B is transmitted together with a data transmitted at the time of the next data transmission, such that utilization efficiency of the communication channel is improved.

The write DMA 142 transmits and writes the write data to the memory 12 of the transmission destination (see reference numeral B18 of FIG. 7 and reference numeral S19 of FIG. 9).

The read of the transmission data is completed in the sequencer #1, such that resources of the read DMA 143 are released (see reference numeral B19 of FIG. 7). When the resources of the read DMA 143 are released, the sequencer #0 starts to use the read DMA 143.

The sequencer #0 issues a read request of the remaining transmission data of 32 B of 2060 B to the read DMA 143 (see reference numeral B20 of FIG. 7 and reference numeral S20 of FIG. 10). In addition, the sequencer #0 transmits the BCC check calculation intermediate value and the count value, together with this read request, to the read DMA 143 (see reference numeral B21 of FIG. 7 and reference numeral S21 of FIG. 10).

The read DMA 143 requests the CPU 11 to read the transmission data from the memory 12 of the transmission source (see reference numeral B22 of FIG. 7). The remaining data of 32 B (=2080 B−2048 B) of the transmission data of 2080 B (=520 B×4) is read from the memory 12 of the transmission source through the CPU 11 depending on this read request (see reference numeral B23 of FIG. 7 and reference numeral S22 of FIG. 10). The data of 32 B read from the memory 12 of the transmission source is input to the consistency checker 1431 in the read DMA 143.

The consistency checker 1431 of the read DMA 143 performs the BCC check on the received transmission data of 32B (see reference numeral B24 of FIG. 7). The consistency checker 1431 resumes the consistency check calculation using the BCC calculation intermediate value and the count value received from the sequencer #0 to calculate the remaining BCC, in the case of performing this BCC check. The consistency checker 1431 checks the consistency of the BCC calculated using the received data of 32 B. Therefore, the BCC check is also completed for the transmission data of the size of 488 B of the fraction for which the BCC check was not completed.

The read DMA 143 transmits the transmission data of 32 B to the sequencer #0 (see reference numeral B25 of FIG. 7 and reference numeral S23 of FIG. 10). In this case, the read DMA 143 also notifies the sequencer #0 of a check result of consistency of a BCC for the remaining fourth storage block.

The sequencer #0 transmits the data of 1024 B stored in the buffer region 153 and the newly read data of 32 B to the write DMA 142 (see reference numeral B26 of FIG. 7 and reference numeral S24 of FIG. 10). The write DMA 142 transmits the data of 1056 B (=1024 B+32 B) to the memory 12 of the transmission destination depending on this instruction. The data of 1056 B may be transmitted to the memory 12 of the transmission destination in two steps of, for example, 1024 B and 32 B.

The write DMA 142 transmits and writes the transmission data to the memory 12 of the transmission destination (see reference numeral B27 of FIG. 7 and reference numeral S25 of FIG. 10), and ends a process. In the above example, since the relatively small amount of data such as 2 KB is transmitted, the data is written only once from the write DMA 142 in units of the data size at which the transmission efficiency is good on the PCIe bus, by the sequencer #0 (see reference numeral B18 of FIG. 7). However, when the greater amount of data is transmitted, the data is written plural times in units of the data size at which the transmission efficiency is good as described above, such that the entire data transmission efficiency is improved.

(C) Effect

As described above, according to the storage apparatus 1 as an embodiment discussed herein, in the case of performing the data transmission from the memory 12 of the transmission source to the memory 12 of the transmission destination, the DMA block 141 divides and transmits the data in units of the size (transmission size) of the integral multiple of 256 B (=MPS), which is the PCIe transmission appropriate size. Therefore, it is possible to improve transmission efficiency of the data on a data transmission channel from the memory 12 of the transmission source to the memory 12 of the transmission destination, such that it is possible to improve data transmission performance in the DMA.

In the sequencer 145, the transmission controller 1472 causes the read DMA 143 to divide and transmit (read) the transmission data from the memory 12 of the transmission source in units of the PCIe transmission appropriate size (for example, the integer multiple of the MPS).

Therefore, it is possible to improve transmission efficiency of the data on a data transmission channel from the memory 12 of the transmission source to the DMA block 141, such that it is possible to improve data transmission performance in the DMA.

In the sequencer 145, the storage controller 1471 stores the transmission data on which the BCC check is performed by the consistency checker 1431 of the DMA block 141 and of which the consistency is confirmed in the buffer region 153 of the memory 146. The transmission controller 1472 causes the write DMA 142 to transmit the transmission data stored in the buffer region 153 in units of the PCIe transmission appropriate size.

Therefore, it is possible to improve transmission efficiency of the data on a data transmission channel from the DMA block 141 to the memory 12 of the transmission destination, such that it is possible to improve data transmission performance in the DMA.

The arbiter 149 switches the sequencer 145 connected to the DMA block 141, such that it is possible to efficiently use DMA blocks 141 of which the number is less than that of sequencers 145. In addition, the number of DMA blocks 141 is made less than that of sequencers 145, such that it is possible to reduce power consumption and a manufacturing cost, and it is possible to miniaturize the data transmission apparatus.

When the sequencer 145 connected to the DMA block 141 is switched by the arbiter 149 during the transmission of the storage block, the DMA block 141 interrupts the BCC check that is being executed by the consistency checker 1431. The DMA block 141 transmits the BCC check calculation intermediate value calculated by the consistency checker 1431 to the sequencer 145 before being switched (the sequencer 145 of which the DMA connection is released). In addition, in this case, the read DMA 143 transmits the count value corresponding to the BCC check calculation intermediate value, together with the BCC check calculation intermediate value, to the sequencer 145 before being switched.

In the sequencer 145, the storage controller 1471 stores the notified count value and the BCC check calculation intermediate value as the count value 152 and the BCC check calculation intermediate value 151 in the memory 146.

In the case in which the sequencer 145 is switched by the arbiter 149 and the DMA block 141 is again connected to the sequencer 145, the transmission controller 1472 issues the next data read instruction to the read DMA 143 of the DMA block 141, the transmission controller 1472 adds the BCC check calculation intermediate value 151 and the count value 152 to the data read instruction to hand over the BCC check calculation intermediate value 151 and the count value 152 to the read DMA 143.

Therefore, the read DMA 143 is able to resume the data read (data transmission) performed before the DMA connection is released and interrupted due to the release of the DMA connection and from the same position as the position before the DMA connection is released.

That is, in the storage apparatus 1, even though the data transmission is interrupted at any timing during the data transmission from the memory 12 of the transmission source to the memory 12 of the transmission destination, it is possible to resume the data transmission at the time of the data transmission by using the BCC calculation intermediate value and the count value.

Therefore, even though the sequencer 145 is switched by the arbiter 149 at a timing at which the data transmission is performed at the PCIe transmission appropriate size by the DMA block 141, there is no need to again start the data transmission from the beginning, and it is possible to efficiently perform the data transmission.

Considering 520 B, which is a processing size in the storage apparatus, and an integral multiple of 256 B, which is a use data size of transmission efficiency by the PCIe, it is conceivable to perform data transmission in units of 65 KB, which is the least common multiple of 256 B and 520 B. However, the data transmission in units of such a large data size causes a situation in which DMA resources are occupied for one data transmission, which is inefficient. For example, the DMA resources are occupied for data transmission immediately ended in an original case due to a small transmission data size, such that another data transmission wastefully waits for the DMA resources, which leads to performance deterioration of the entire system. In the storage apparatus 1, the DMA block 141 performs data transmission at the integral multiple (for example, four times in the case in which a transmission size is 1 KB) of 256 B, which is the PCIe transmission appropriate size, such that it is possible to realize efficient data transmission without occupying the DMA resources.

In the standard of the PCIe, an upper limit of a data size that is able to be read at one time is defined as 4 KB, and it is thus preferable to set a transmission size for read to 4 KB or less. It is also expected that the occupation of the DMA resources will be avoided by setting the transmission size to 4 KB or less.

In addition, it is preferable to appropriately determine a transmission size for write in consideration of restrictions on data transmission in other devices such as a CPU.

(D) Other

The disclosed technology is not limited to the abovementioned embodiment, and is able to be variously modified without departing from the gist of the present embodiment. The respective configurations and the respective processes according to the present embodiment are able to be selected as needed, or may be appropriately combined with each other.

For example, in the embodiment described above, the storage apparatus 1 includes two CMs 10, but the storage apparatus 1 is not limited thereto, and may include one CM 10 or three or more CMs 10.

In addition, in each CM 10, the number of cores 111 included in the CPU 11, or the number of DMA blocks 141 included in the DMA controller 14 and the number of sequencers 145 included in the DMA controller 14 are also able to be appropriately changed.

In addition, according to the disclosure described above, it is possible to implement and manufacture the present embodiment by those skilled in the art.

According to the embodiment, it is possible to efficiently perform data transmission from a first memory to a second memory.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A data transmission apparatus that transmits transmission data from a first memory to a second memory in a data transfer destination apparatus through a communication channel connecting between the data transmission apparatus and the data transmission destination apparatus, the first memory storing data in units of a first data block of a first data size, and the communication channel having a width of a second data size, comprising:
   a storage that stores the transmission data to be transmitted from the first memory in the data transmission apparatus to the second memory in the data transmission destination apparatus; and
   a transmission controller that receives, in units of an integral multiple of the second data size, the data read from the first memory and processed in units of the second data size, stores the data as the transmission data in the storage, and transmits the transmission data stored in the storage to the second memory in a unit of data of the second data size.

2. The data transmission apparatus according to claim 1, wherein the first data block has matching information,
   the data transmission apparatus further comprising:
   at least one transmission executer that executes transmission of the transmission data by reading the transmission data from the first memory and writing the transmission data to the second memory, the first memory being a transmission source, and the second memory being a transmission destination;
   a plurality of transmission instructors that instruct the at least one transmission executer to transmit the transmission data, a number of the transmission instructors being more than that of the at least one transmission executer;
   a switching controller that switches a transmission instructor that is to instruct the at least one transmission executer to transmit the transmission data among the plurality of transmission instructors; and
   a consistency confirmer that confirms consistency of the transmission data using the matching information and calculates a consistency confirmation calculation intermediate value while the consistency is being confirmed,
   when the switching controller switches a transmission instructor, transmission by the transmission instructor before the switching is interrupted and then transmission by a transmission instructor after the switching is started;
   the interrupting of transmission by the transmission instructor before the switching interrupts the confirming of the consistency by the consistency confirmer and while the confirming of the consistency by the consistency confirmer interrupted, the consistency confirmer stores the consistency confirmation calculation intermediate value in the storage;
   the data transmission apparatus further comprising
   a notifier that notifies, when the transmission by the transmission instructor after the switching is executed, the consistency confirmer of the consistency confirmation calculation intermediate value and progress information of the confirmation of the consistency together with a transmission resume instruction to the at least one transmission executer; and the consistency confirmer resumes the confirmation of the consistency based on the consistency confirmation calculation intermediate value and the progress information that are notified by the notifier.

3. A data transmission method by a data transmission apparatus that transmits transmission data from a first memory to a second memory in a data transfer destination apparatus through a communication channel connecting between the data transmission apparatus and the data transmission destination apparatus, the first memory storing data in units of a first data block of a first data size, and the communication channel having a width of a second data size, comprising:

storing the transmission data to be transmitted from the first memory in the data transmission apparatus to the second memory in the data transmission destination apparatus; and receiving, in units of an integral multiple of the second data size, the data read from the first memory and processed in units of the second data size, storing the data as the transmission data in the storage, and transmitting the transmission data stored in the storage to the second memory in a unit of data of the second data size.

4. The data transmission method according to claim 3, wherein the first data block has matching information, and the data transmission apparatus includes:

at least one transmission executer that executes transmission of the transmission data by reading the transmission data from the first memory and writing the transmission data to the second memory, the first memory being a transmission source, and the second memory being a transmission destination;

a plurality of transmission instructors that instruct the at least one transmission executer to transmit the transmission data, a number of the transmission instructors being more than that of the at least one transmission executer;

a switching controller that switches a transmission instructor that is to instruct the at least one transmission executer to transmit the transmission data among the plurality of transmission instructors; and a consistency confirmer that confirms consistency of the transmission data using the matching information and calculates a consistency confirmation calculation intermediate value while the consistency is being confirmed, the data transmission method further comprising:

when the switching controller switches a transmission instructor, interrupting transmission by the transmission instructor before the switching and then starting transmission by a transmission instructor after the switching;

upon interrupting of transmission by the transmission instructor before the switching, interrupting the confirming of the consistency by the consistency confirmer;

while the confirming of the consistency by the consistency confirmer interrupted, storing the consistency confirmation calculation intermediate value in the storage;

notifying, when the transmission by the transmission instructor after the switching is executed, the consistency confirmer of the consistency confirmation calculation intermediate value calculated when the confirmation of the consistency by the consistency confirmer is interrupted and progress information of the confirmation of the consistency together with a transmission resume instruction to the at least one transmission executer; and resuming the confirmation of the consistency based on the notified consistency confirmation calculation intermediate value and the progress information, by the consistency confirmer.

* * * * *